(12) United States Patent
Nakamura et al.

(10) Patent No.: US 8,099,486 B2
(45) Date of Patent: Jan. 17, 2012

(54) COMMUNICATION SYSTEM

(75) Inventors: Tomoki Nakamura, Nagoya (JP);
Manabu Isshiki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 323 days.

(21) Appl. No.: 12/052,961

(22) Filed: Mar. 21, 2008

(65) Prior Publication Data

US 2008/0244000 A1    Oct. 2, 2008

(30) Foreign Application Priority Data

Mar. 29, 2007  (JP) ................................ 2007-088924

(51) Int. Cl.
*G06F 15/16* (2006.01)
(52) U.S. Cl. ........................................ 709/223; 709/245
(58) Field of Classification Search .................. None
See application file for complete search history.

(56) References Cited

U.S. PATENT DOCUMENTS

| | | | | |
|---|---|---|---|---|
| 7,124,178 | B2* | 10/2006 | Torii | 709/223 |
| 7,373,347 | B2* | 5/2008 | Takahashi et al. | 1/1 |
| 7,444,278 | B2* | 10/2008 | Bennett | 704/8 |
| 7,664,630 | B2* | 2/2010 | Fukuoka et al. | 704/8 |
| 2002/0054340 | A1 | 5/2002 | Tokutomi et al. | |
| 2004/0138964 | A1* | 7/2004 | Okada et al. | 705/27 |
| 2004/0210841 | A1* | 10/2004 | Takahashi | 715/536 |
| 2006/0161658 | A1* | 7/2006 | Noguchi | 709/225 |
| 2006/0221356 | A1 | 10/2006 | Kawai | |

FOREIGN PATENT DOCUMENTS

| | | |
|---|---|---|
| JP | 2002123384 A | 4/2002 |
| JP | 2002-324017 A | 11/2002 |
| JP | 2004-103007 A | 4/2004 |
| JP | 2004-213462 A | 7/2004 |
| JP | 2005-227849 A | 8/2005 |
| JP | 2006-260272 A | 9/2006 |
| JP | 2006-323508 A | 11/2006 |

OTHER PUBLICATIONS

Pan J et al: "An overview of DNS-based server selections in content distribution network" Computer Networks, Elsevier Science Publishers B.V., Amsterdam, NL, vol. 43, No. 6, Dec. 20, 2003, pp. 695-711, XP004470525 ISSN: 1389-1286 p. 695-p. 700.
European Patent Office, European Search Report for Related EP Application No. 08251011 dated Dec. 23, 2008.
Japan Patent Office; Office Action in Japanese Patent Application No. 2007-088924 mailed Mar. 3, 2009.

* cited by examiner

*Primary Examiner* — Bunjob Jaroenchonwanit
(74) *Attorney, Agent, or Firm* — Baker Botts L.L.P.

(57) ABSTRACT

A client terminal is capable of communicating with an address server. The client terminal includes a displaying unit, a language determining unit, a language information transmitting unit, a service information acquiring unit, and a display controlling unit. The displaying unit displays a page. The language determining unit determines a language to be used for displaying the page on the displaying unit. The language information transmitting unit transmits language information to the address server. The language information indicates the language determined by the language determining unit. The service information acquiring unit acquires service information from a data server based on address information transmitted from the address server. The display controlling unit controls the displaying unit to display, by using the language determined by the language determining unit, the page including the service information acquired by the service information acquiring unit.

25 Claims, 14 Drawing Sheets

FIG.2

ADDRESS SERVER DATABASE 25a

| REGION | LANGUAGE | PRINTER MODEL | LINK (URL) |
|---|---|---|---|
| USA | ENG | M-86 | http://www.brother-usa.com/genuine_ink.htm |
| USA | ENG | M-85 | http://www.brother-usa.com/genuine_ink.htm |
| USA | ENG | M-46 | http://www.brother-usa.com/genuine_ink.htm |
| USA | ENG | M-924 | http://www.brother-usa.com/genuine_laser.htm |
| ... | ... | ... | ... |
| USA | Unknown | Unknown | http://www.brother-usa.com/genuine.htm |
| JPN | JPN | ANY | http://www.brother.co.jp/genuine_supplies.htm |
| ... | ... | ... | ... |
| CAN | ENG | | ... |
| CAN | FRE | | ... |
| ... | ... | ... | ... |
| ... | ... | ... | ... |
| ... | ... | ... | ... |
| — | — | — | http://www.brother.com/original.htm |

25a1 / 25a2 / 25a3 / 25a4

WEB SERVER DATABASE 65a

| PRINTER MODEL (65a1) | LINK (URL) (65a2) |
|---|---|
| M-86 | http://www.brother-usa.com/m86.htm |
| M-86 | http://www.brother-usa.com/m86_inkcartrige.htm |
| M-86 | http://www.brother-usa.com/m86_result_for_paperjam.htm |
| ... | ... |
| M-85 | http://www.brother-usa.com/m85.htm |
| ... | ... |
| M-46 | http://www.brother-usa.com/m46.htm |
| ... | ... |
| M-924 | http://www.brother-usa.com/m924.htm |
| ... | ... |
| ... | ... |
| ... | ... |
| ... | ... |
| ... | ... |
| ... | ... |
| ... | ... |
| ... | ... |
| ... | ... |
| ... | ... |
| ... | ... |

FIG.9

ADDRESS SERVER DATABASE 125a

| REGION | LANGUAGE | PRINTER MODEL | STATUS | LINK (URL) |
|---|---|---|---|---|
| USA | ENG | M-86 | Ready | http://www.brother-usa.com/genuine_ink.htm |
| USA | ENG | M-86 | Ink Empty | http://www.brother-usa.com/supplies_ink.htm |
| USA | ENG | M-86 | Ink Near Empty | http://www.brother-usa.com/supplies_ink.htm |
| USA | ENG | M-85 | Ready | http://www.brother-usa.com/genuine_laser.htm |
| USA | ENG | M-85 | Ink Empty | http://www.brother-usa.com/supplies_ink.htm |
| ⋮ | ⋮ | ⋮ | ⋮ | ⋮ |
| ⋮ | ⋮ | ⋮ | ⋮ | ⋮ |
| ⋮ | ⋮ | ⋮ | ⋮ | ⋮ |
| — | — | — | — | http://www.brother.com/original.htm |

WEB SERVER DATABASE  165a

| PRINTER MODEL 65a1 | STATUS 165a3 | LINK (URL) 65a2 |
|---|---|---|
| M-86 | Ready | http://www.brother-usa.com/supplies_ink/m86.htm |
| M-86 | Ink Empty | http://www.brother-usa.com/supplies_ink/m86_inkcartrige.htm |
| M-86 | Paper Jam | http://www.brother-usa.com/troubles/m86_result_for_paperjam.htm |
| ... | ... | ... |
| M-85 | Ready | http://www.brother-usa.com/supplies_ink/m85.htm |
| ... | ... | ... |
| M-46 | Ready | http://www.brother-usa.com/supplies_ink/m46.htm |
| ... | ... | ... |
| M-924 | Ready | http://www.brother-usa.com/supplies_laser/m924.htm |
| ... | ... | ... |
| ... | ... | ... |
| ... | ... | ... |
| ... | ... | ... |
| ... | ... | ... |
| ... | ... | ... |
| ... | ... | ... |
| ... | ... | ... |

COMMUNICATION SYSTEM

CROSS REFERENCE TO RELATED APPLICATION

This application claims priority from Japanese Patent Application No. 2007-088924 filed Mar. 29, 2007. The entire content of its priority application is incorporated herein by reference.

TECHNICAL FIELD

The present invention relates to a client terminal, a communication system, a communication method, and a computer-readable recording medium that stores a data processing program.

BACKGROUND

A communication system well known in the art is configured of a device, such as a printer, scanner, facsimile device, or multifunction device; a client configured of a personal computer for controlling the device; and a Web server for providing Web pages to the client. The device, client, and Web server are connected to and capable of communicating with each other via a network.

Japanese unexamined patent application publication No. 2002-123384 describes a technology related to this communication system. In this technology, when the amount of ink falls below a prescribed amount, the printing device accesses a Web server, which is an ink purchasing site.

However, the system disclosed in Japanese unexamined patent application publication No. 2002-123384 does not consider the language in which the Web page is described (the natural language, such as Japanese, Chinese, and English, for example). Hence, if the language used in the Web page is one the user is unfamiliar with, the user cannot comprehend the content of the Web page.

One possible resolution is to provide options on the Web page for the user to select a desired language and to display the Web page in the language selected by the user. However, selecting a desired language from the enormous number of possible languages can be a troublesome step for the user.

SUMMARY

In view of the foregoing, it is an object of the invention to provide a client, communication system, and client program capable of displaying service information related to a device in a language familiar to the user, without requiring the user to perform a troublesome operation.

In order to attain the above and other objects, the invention provides a client terminal capable of communicating with an address server. The client terminal includes a displaying unit, a language determining unit, a language information transmitting unit, a service information acquiring unit, and a display controlling unit. The displaying unit displays a page. The language determining unit determines a language to be used for displaying the page on the displaying unit. The language information transmitting unit transmits language information to the address server. The language information indicates the language determined by the language determining unit. The service information acquiring unit acquires service information from a data server based on address information transmitted from the address server. The display controlling unit controls the displaying unit to display, by using the language determined by the language determining unit, the page including the service information acquired by the service information acquiring unit.

According to another aspect, the present invention provides a communication system including a network; and a client terminal and an address server capable of communicating with each other via the network. The client terminal includes a displaying unit, a language determining unit, a language information transmitting unit, a service information acquiring unit, and a display controlling unit. The displaying unit displays a page. The language determining unit determines a language to be used for displaying the page on the displaying unit. The language information transmitting unit transmits language information to the address server, the language information indicating the language determined by the language determining unit. The service information acquiring unit acquires service information from a data server based on address information transmitted from the address server, the address information specifying the data server that stores service information to be displayed by using the language determined by the language determining unit. The display controlling unit controls the displaying unit to display, by using the language determined by the language determining unit, the page including the service information acquired by the service information acquiring unit. The address server includes a language information receiving unit, a data server determining unit, and an address information transmitting unit. The language information receiving unit receives the language information transmitted by the language information transmitting unit of the client terminal. The data server determining unit determines the data server based on the language information received by the language information receiving unit. The address information transmitting unit transmits address information to the client terminal, the address information specifying the data server determined by the data server determining unit.

According to another aspect, the present invention provides a communication method for a client terminal and which is capable of communicating with an address server. The communication method includes step of: determining a language to be used for displaying a page on a displaying unit of the client; transmitting language information to the address server, the language information indicating the language determined in the determining process; acquiring service information from a data server based on address information transmitted from the address server; and controlling the displaying unit to display, by using the language determined in the determining process, the page including the service information.

According to another aspect, the present invention provides a computer-readable recording medium that stores a data processing program provided on a client terminal capable of communicating with an address server. The data processing program includes instructions for: determining a language to be used for displaying a page on a displaying unit; transmitting language information to the address server, the language information indicating the language determined in the determining process;
acquiring service information from a data server based on address information transmitted from the address server, and controlling the displaying unit to display, by using the language determined in the determining process, the page including the service information.

BRIEF DESCRIPTION OF THE DRAWINGS

The particular features and advantages of the invention as well as other objects will become apparent from the following description taken in connection with the accompanying drawings, in which:

FIG. 2 is an explanatory diagram conceptually illustrating an address server database according to the first embodiment;

FIG. 9 is an explanatory diagram conceptually illustrating an address server database according to the second embodiment;

FIG. 10 is an explanatory diagram conceptually illustrating a Web server database according to the second embodiment;

DETAILED DESCRIPTION

Figure 1:
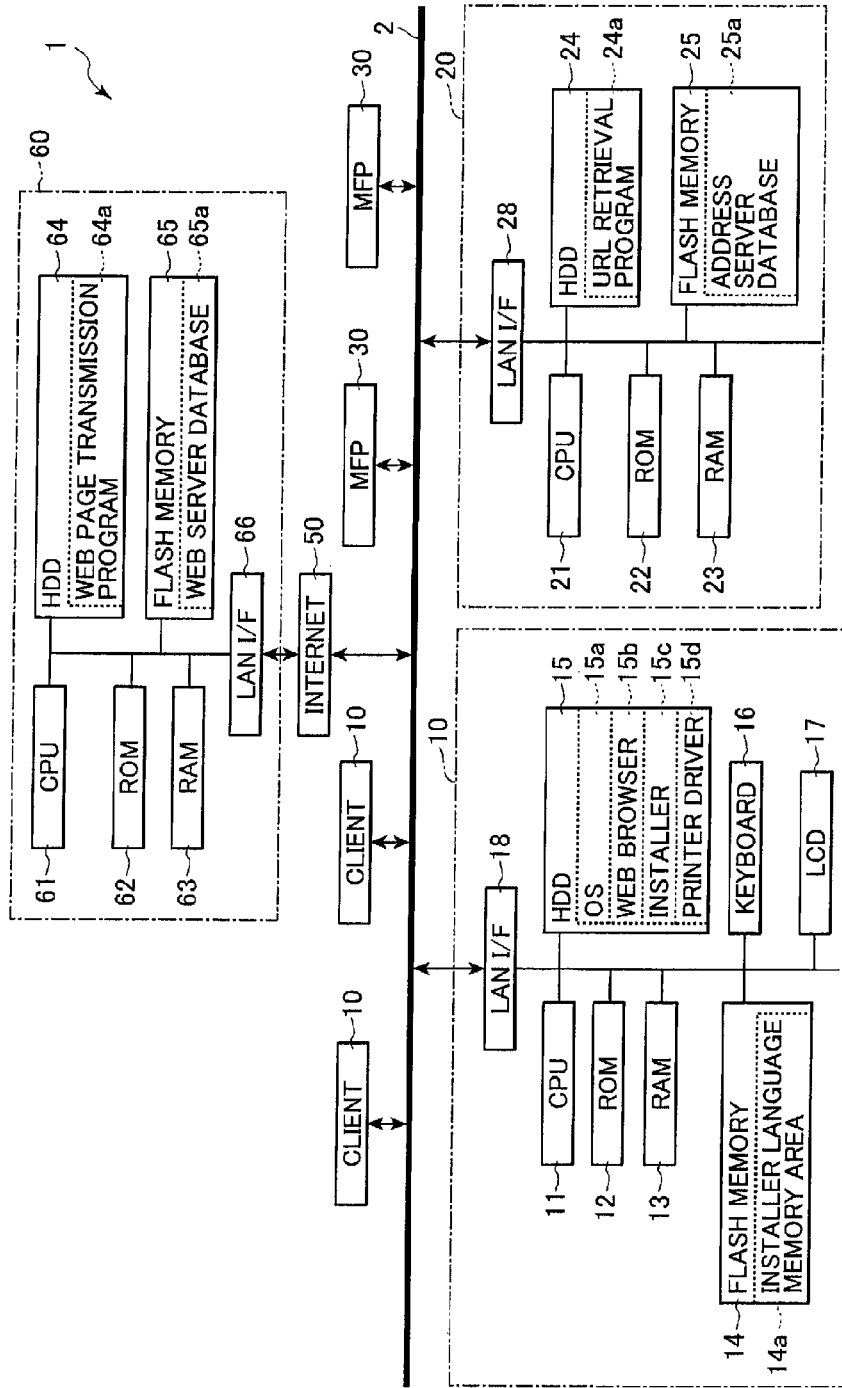
FIG. 1 is a block diagram showing the electrical structure of a communication system according to a first embodiment of the invention.

A communication system in accordance with a first embodiment is shown in FIG. 1. In a communication system 1, a plurality of client terminal 10 (three client terminals 10 in the first embodiment), an address server 20, and a multifunctional peripheral (MFP) 30 are connected each other by a local area network (LAN) 2 so that data can be transferred therebetween. The MFP 30 is a shared device fox each client terminal 10.

Each client terminal 10 is a personal computer capable of communicating with a plurality of Web servers 60 via an internet 50. Each Web server has specific language and service information described in the specific language. One of the plurality of data servers 60 is shown in FIG. 1 for simplify the description of the communication system 1. For example, the client terminal 10 can acquire the service information related to the MFP 30, such as information on ordering ink cartridges used by the MFP 30, from the Web server 60 via the internet 50 and can display this service information on a LCD 17 (described later).

The client terminal 10 includes a CPU 11, a ROM 12, a RAM 13, a flash memory 14, hard disk (HDD) 15, a keyboard 16, the LCD 17, and a LAN interface (LAN I/F) 18.

The CPU 11 is a processor that executes various programs stored in the ROM 12. The RAM 13 is a random access memory that includes a work area for temporarily storing variables and the like when the CPU 11 executes programs.

The flash memory 14 is a nonvolatile memory capable of storing various data that can be written thereto and read therefrom. The flash memory 14 can preserve data when the power to the client terminal 10 is cut off. The flash memory 14 includes an installer language memory area 14a storing language information preset for installer 15c (described later).

The HDD 15 is a rewritable memory and stores an operating system (OS) 15a, a Web browser 15b, the installer 15c, and printer driver 15d.

The OS 15a is software providing an operating environment for the user and managing the computer system and may be MS-DOS, Windows (registered trademark), or UNIX (registered trademark), for example. Regional information and language information has already been set in the OS 15a.

The Web browser 15b is software that allows the user to browse Web pages on the internet 50 and may be Netscape Navigator or Internet Explorer, for example. The installer 15c is software for installing application programs used on the client terminal 10. The printer driver 15d is software for controlling the MFP 30.

The keyboard 16 is an input device for inputting operation by user. The LCD 17 is configured of a liquid crystal display and functions to display various data such as a page including characters, figures, or icons. The LAN interface 26 establishes a connection with a plurality of devices (other client terminals 10, address server 20, MFP 30, and Web server 60) via the LAN 2.

The address server 20 includes a database. The address server 20 performs to receive a request from and send results to the client terminal 10 when the address server 20 receives a command from the client terminal 10. The address server 20 includes a CPU 21, a ROM 22, a RAM 23, a HDD 24, a flash memory 25, and LAN interface 26.

The CPU 21 is a processor that executes various programs stored in the ROM 22. The RAM 23 is a random access memory that includes a work area for temporarily storing variables and the like when the CPU 21 executes programs.

The HDD 24 is a rewritable memory and stores an URL retrieval program 24a. The URL retrieval program 24a implements an URL retrieval process shown in the flowchart of FIG. 6. The URL retrieval process will be described later.

The flash memory 25 is a nonvolatile memory capable of storing various data that can be written thereto and read therefrom. The flash memory 25 can preserve data when the power to the address server 20 is cut off. The flash memory 25 stores an address server database 25a shown in FIG. 2.

As shown in FIG. 2, the address server database 25a stores region data 25a1, language data 25a2, printer model name 25a3, and linked URL 25a4 in association with each other. The region data 25a1, the languages data 25a2, and the printer model name 25a3 are used as one of search keys (retrieving keys) for searching and extracting the linked URL 25a4 from the address server database 25a.

For example, one correlation stored in the address server database 25a has "USA" indicating the United States as the region data 25a1, "ENG" signifying English as the language data 25a2, "M-86" as the printer model name 25a3, and "http://www.brother-usa.com/genuine_ink.htm" as the linked URL 25a4.

When provided region information, language information, and printer model name from the client terminal 10, the URL retrieval program 24a uses the address server database 25a to extract the linked URL of the corresponding link from the address server database 25a and transmits the extracted URL to the client terminal 10. In this way, the client terminal 10 can acquire the linked URL corresponding to its own requested region, language, and printer model.

The MFP 30 has a plurality of functions including printer function, facsimile function, copier function, and photomedia capture function. The MFP 30 is provided with an inkjet recording device for forming images on a recording medium.

The recording device receives ink supplied from an ink cartridge and ejects ink droplets onto the recording medium through a print head. Each MFP 30 has printer model such as identified data.

The Web server 60 is a computer that functions to transmit HTML files including hypertext data and image data to the client terminal 10 in response to requests from the Web browser 15*b* of the client terminal 10. The Web server 60 includes a CPU 61, a ROM 62, a RAM 63, a HDD 64, a flash memory 65, and LAN interface 66.

The CPU 61 is a processor that executes various programs stored in the ROM 62. The RAM 63 is a random access memory that includes a work area for temporarily storing variables and the like when the CPU 61 executes programs.

The HDD 64 is a rewritable memory and stores a Web page transmission program 64*a*. The Web page transmission program 64*a* implements a Web page transmission process shown in the flowchart of FIG. 7.

The flash memory 65 is a nonvolatile memory capable of storing various data that can be written thereto and read therefrom. The flash memory 65 can preserve data when the power to the client terminal 10 is cut off. The flash memory 65 stores a Web server database 65*a* shown in FIG. 3.

The Web server database 65*a* stores correlations of printer model names 65*a*1 and linked URLs 65*a*2. One example of a correlation stored in the Web server database 65*a* is "M-86" as the printer model names 65*a*1 and "http://www.brother-usa.com/m86.htm" as the linked URL 65*a*2.

When data for the printer model name is provided by the client terminal 10, the CPU 61 executes the Web page transmission program 64*a* and extracts the linked URL corresponding to the printer model name from the Web server database 65*a* and transmits the extracted URL to the client terminal 10. In this way, the client terminal 10 can acquire the linked URL corresponding to its requested printer model name.

Figures 3, 4:
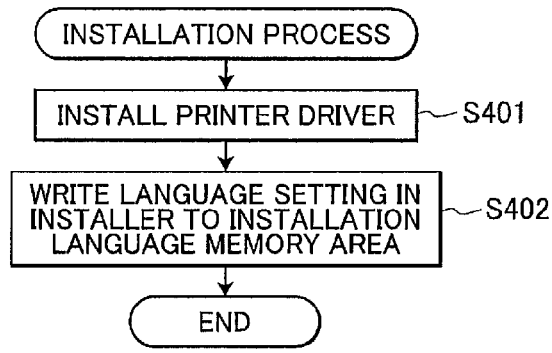
FIG. 3 is an explanatory diagram conceptually illustrating a Web server database according to the first embodiment.
FIG. 4 is a flowchart illustrating steps in an installation process according to the first embodiment.

Next, an installation process will be described with reference to the flowchart in FIG. 4. In this process, the installer 15*c* installs the printer driver 15*d* on the HDD 15. The installation process is executed when a CD-ROM storing the printer driver 15*d* is placed in a CD-ROM drive provided in the client terminal 10 and the user issues a command to begin installation, for example.

In S401 at the beginning of the installation process, the installer 15*c* installs the printer driver 15*d*. More specifically, the CPU 11 reads the printer driver 15*d* from the CD-ROM and stores the printer driver 15*d* on the HDD 15.

In S402 the installer 15*c* writes a preset language to the installer language memory area 14*a*. The preset language is the language that the installer 15*c* uses for displaying messages and the like on the LCD 17. For example, when the installer 15*c* in French is launched, the CPU 11 stores language information indicating French in the installer language memory area 14*a* using the installer 15*c*. The language preset in the installer 15*c* is unrelated to the language preset in the OS 15*a* or printer driver 15*d*. Subsequently, the installation process ends.

Next, the URL creation process will be described with reference to the flowchart in FIG. 5. The URL creation process serves to create a URL as transmission data to be transmitted to the address server 20. The URL is a hypertext data including a request for the transmission of the Web page.

The CPU 11 of the client terminal 10 executes the URL creation process with using the printer driver 15*d*, when the user commands execution via the keyboard 16 while the printer driver 15*d* is running.

In S501 at the beginning of the URL creation process, the CPU 11 acquires regional information and language information from the OS 15*a*. In S502 the CPU 11 determines whether the regional information and language settings in the OS 15*a* were acquired. If the regional information and language information was acquired (S502: YES), the CPU 11 advances to S507.

However, if the regional and language information could not be acquired (S502: NO), then in S503 the CPU 11 determines whether language information is stored in the installer language memory area 14*a*. If language information is stored in the installer language memory area 14*a* (S503: YES), then in S504 the CPU 11 acquires the language information from the installer language memory area 14*a*. If such information is not, stored (S503: NO), then in S505 the CPU 11 acquires language information preset in the printer driver 15*d*. After acquiring language information in either S504 or S505, in S506 the CPU 11 sets the regional information to "Unknown" and advances to S507.

In S507 the CPU 11 acquires the printer model name preset in the printer driver 15*d*. In S508 the CPU 11 creates a URL by appending the printer model name and the regional information and the language information acquired in the above processes to a URL of the address server 20 preset in the printer driver 15*d*.

For example, if the printer model name "M-86" and the URL of the address server 20 "http://update.brother.co.jp/index?" have been integrated in the printer driver 15*d* and USA and English have been acquired as the regional and language information in the above processes, in S508 the CPU 11 creates the URL "http://update.brother.co.jp/index?model=M-86&country=USA&lang=ENG."

After creating the URL in S508, in S509 the CPU 11 launches the Web browser 15*b* and transfers the generated URL to the Web browser 15*b* as transmission data. Subsequently, the URL creation process ends.

Upon receiving the generated URL, the Web browser 15*b* transmits this URL to the address server 20 at the address specified in the URL. Subsequently, the Web browser 15*b* acquires from the address server 20 a URL for a link retrieved through a URL retrieval process described later.

Through the URL creation process, the CPU 11 of the client terminal 10 determines a language to be used for displaying the page on the LCD 17, and creates a URL including language information attached to the URL of the address server 20 as transmission data to be transmitted to the address server 20, thereby easily transmitting the language information to the address server 20. The language information indicates the language preset in the OS 15*a* or in the printer driver 15*d* used by the client terminal 10 and likely the language that the user is accustomed to using on a daily basis. Hence, the client terminal 10 can transmit the language information that the user works with daily to the address server 20 as language information.

Since the CPU 11 executes the URL creation process with using the printer driver 15*d*, it is not necessary to install a new application for performing the URL creation process. In addition, since the printer driver 15*d* must be installed to use the MFP 30, using the printer driver 15*d* executed the URL creation process is convenient for the user. Further, since the printer model name is preset in the printer driver 15*d*, the CPU 11 can easily acquire the printer model name by using the printer driver 15*d* when executing this process. Further, the client terminal 10 can transmit transmission data to the Web server 60 through a simple configuration of inputting data created by the printer driver 15*d* in the Web browser 15*b*. In other words, in addition to its original structure, the printer driver 15*d* has a simple structure for creating transmission data and inputting the data into the Web browser 15*b*.

Next, the URL retrieval process will be described with reference to the flowchart in FIG. 6. The address server 20 executes the URL retrieval process to retrieve a linked URL based on the URL transmitted from the client terminal 10 in the URL creation process of FIG. 5 and to transmit the retrieved linked URL to the client terminal 10.

Figure 5:
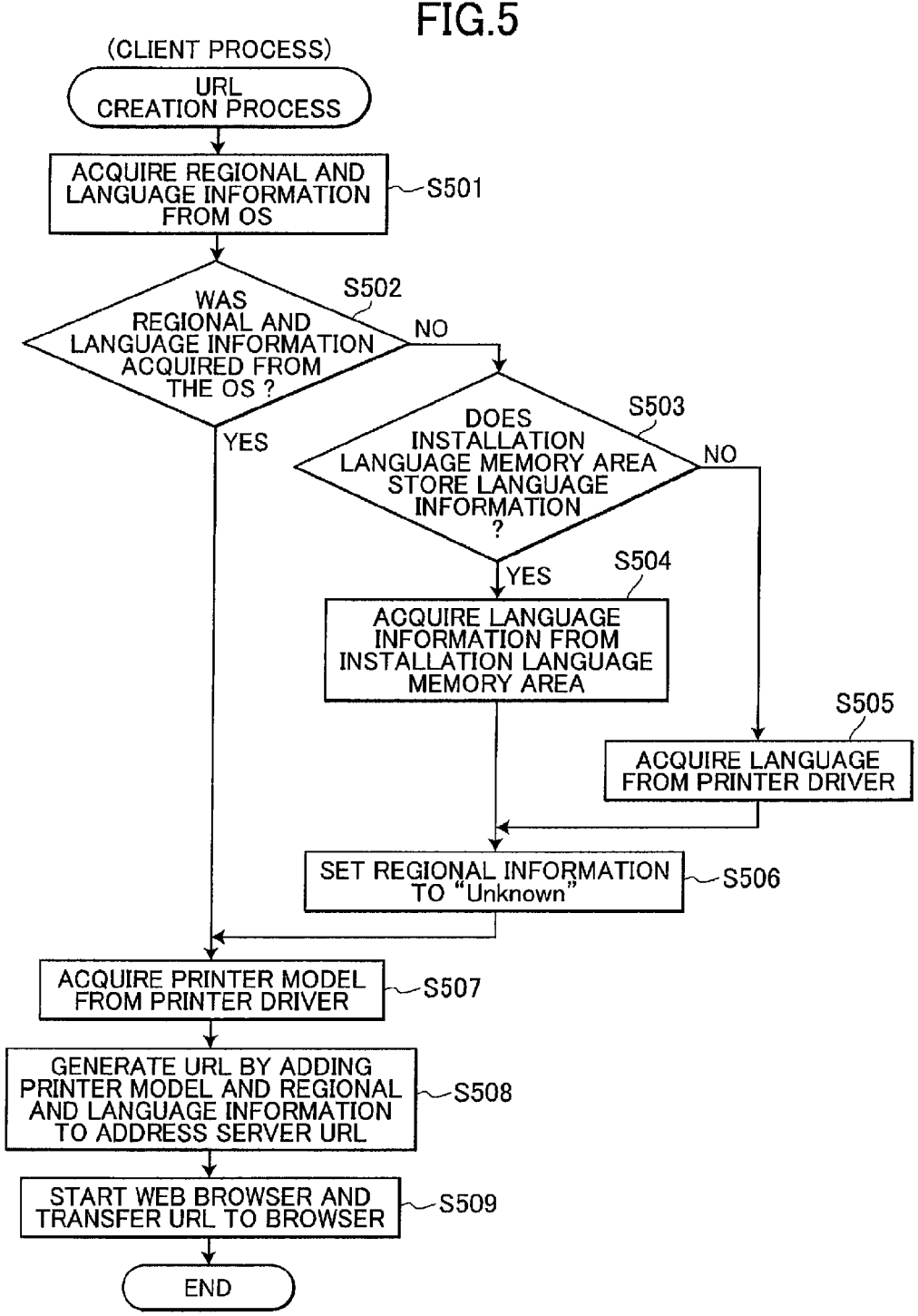
FIG. 5 is a flowchart illustrating steps in a URL creation process according to the first embodiment.

The CPU 21 of the address server 20 performs the URL retrieval process according to the URL retrieval program 24*a* when a URL is received from the client terminal 10 in the URL creation process described in FIG. 5.

In S601 at the beginning of the URL retrieval process, the CPU 21 acquires the URL for accessing the address server 20 via the Web browser 15*b* from the client terminal 10. In the above example, the address server 20 acquires the URL "http://update.brother.co.jp/index?model=M-86&country=USA&lang=ENG" created in S508 of FIG. 5.

In S602 the CPU 21 extracts the regional information, the language information, and the printer model name from the acquired URL. In the above example, the CPU 21 acquires the regional information "USA," the language information "ENG," and the printer model name "M-86."

In S603 the CPU 21 determines whether at least one of the regional information, the language information, and the printer model name could be acquired. If at least one of the data could be acquired (S603: YES), in S604 the CPU 21 determines whether the regional information could be acquired The CPU 21 advances to S606 if regional information could be acquired (S604: YES) or first sets the regional information to "Unknown" in S605 before advancing to S606 when regional information could not be acquired (S604: NO).

In S606 the CPU 21 determines whether language information could be acquired. If language information could be acquired (S606: YES), the CPU 21 advances directly to S608. However, if language information could not be acquired (S606: NO), then in S607 the CPU 21 sets the language information to "Unknown" and subsequently advances to S608.

In S608 the CPU 21 determines whether the printer model name could be acquired. If the printer model name could be acquired (S608: YES), then the CPU 21 advances directly to S610. However, if the printer model name could not be acquired (S608: NO), then in S609 the CPU 21 sets the printer model name to "Unknown" and subsequently advances to S610.

In S610 the CPU 21 generates a searching key for retrieving a linked URL from the address server database 25*a*, based on combination of the regional information, language information, and printer model name.

In S611 the CPU 21 determines whether combination of the region data 25*a*1, language information 25*a*2, and printer model name 25*a*3 corresponding to the searching key exists in the address server database 25*a*. If the combination exists (S611: YES), in S612 the CPU 21 acquires the linked URL corresponding to the combination (the searching key). In this example, the CPU 21 acquires the URL "http://www.brother-usa.com/genuine_ink.htm" from the address server database 25*a*.

However, if the combination does not exist in the address server database 25*a* (S611: NO) or if none of the regional information, language information, and printer model name could be extracted from the URL acquired from the client terminal 10 in S603 (S603: NO), in S613 the CPU 21 acquires a predetermined default URL from the address server database 25*a* as the linked URL. For example, the CPU 21 acquires the URL "http://www.brother-usa.com/original.htm" from the address server database 25*a*.

After acquiring a linked URL from either S612 or S613, the CPU 21 determines in S614 whether the printer model name is set to "Unknown." If the printer model name is not set to "Unknown" (S614: NO), then in S615 the CPU 21 adds the printer model name to the linked URL acquired in S612 or S613 and advances to S616. For example, the CPU 21 generates the URL "http://www.brother-usa.com/genuine_ink.htm&model=M-86."

However, if the printer model name is set to "Unknown" (S614: YES), the CPU 21 skips S615 and advances directly to S616.

In S616 the CPU 21 transmits a command to the Web browser 15*b* of the client terminal 10 to redirect to either the URL produced by adding the printer model name to the linked URL in S615 or the linked URL without the added printer model name, and subsequently ends the URL retrieval process. Upon receiving this command, the Web browser 15*b* of the client terminal 10 is redirected to the specified URL.

Through the URL retrieval process, the address server 20 can acquire a linked URL corresponding to language information included in the URL received from the client terminal 10. Further, since the URL received from the client terminal 10 has the printer model name in addition to the language information, the address server 20 can acquire service information corresponding to the printer model name. Further, since the client terminal 10 includes the regional information in the URL in addition to the language information and printer model name, the address server 20 can acquire service information corresponding to the user's region.

For example, when the service information includes operating instructions for the MFP 30 and repair-related information, the address server 20 can retrieve a linked URL providing service information related to operating instructions and repairs for the MFP 30 in English when the language information specifies English. However, in some cases, the service information may include contact information, such as telephone numbers or addresses for service centers. If the data server receives a linked URL for the United States when the user is located in England in this case, the URL will not be relevant to the user. Hence, by including the regional information in the data transmitted to the address server 20, the address server 20 can provide service information corresponding to the user's location.

Next, the Web page transmission process will be described with reference to the flowchart in FIG. 7. The CPU 61 of the Web server 60 executes this Web page transmission process to transmit a Web page to the Web browser 15*b* of the client terminal 10 in response to a transmission request from the Web browser 15*b* after the Web browser 15*b* receives a redirect command from the address server 20 in the URL retrieval process of FIG. 6.

Figure 6:
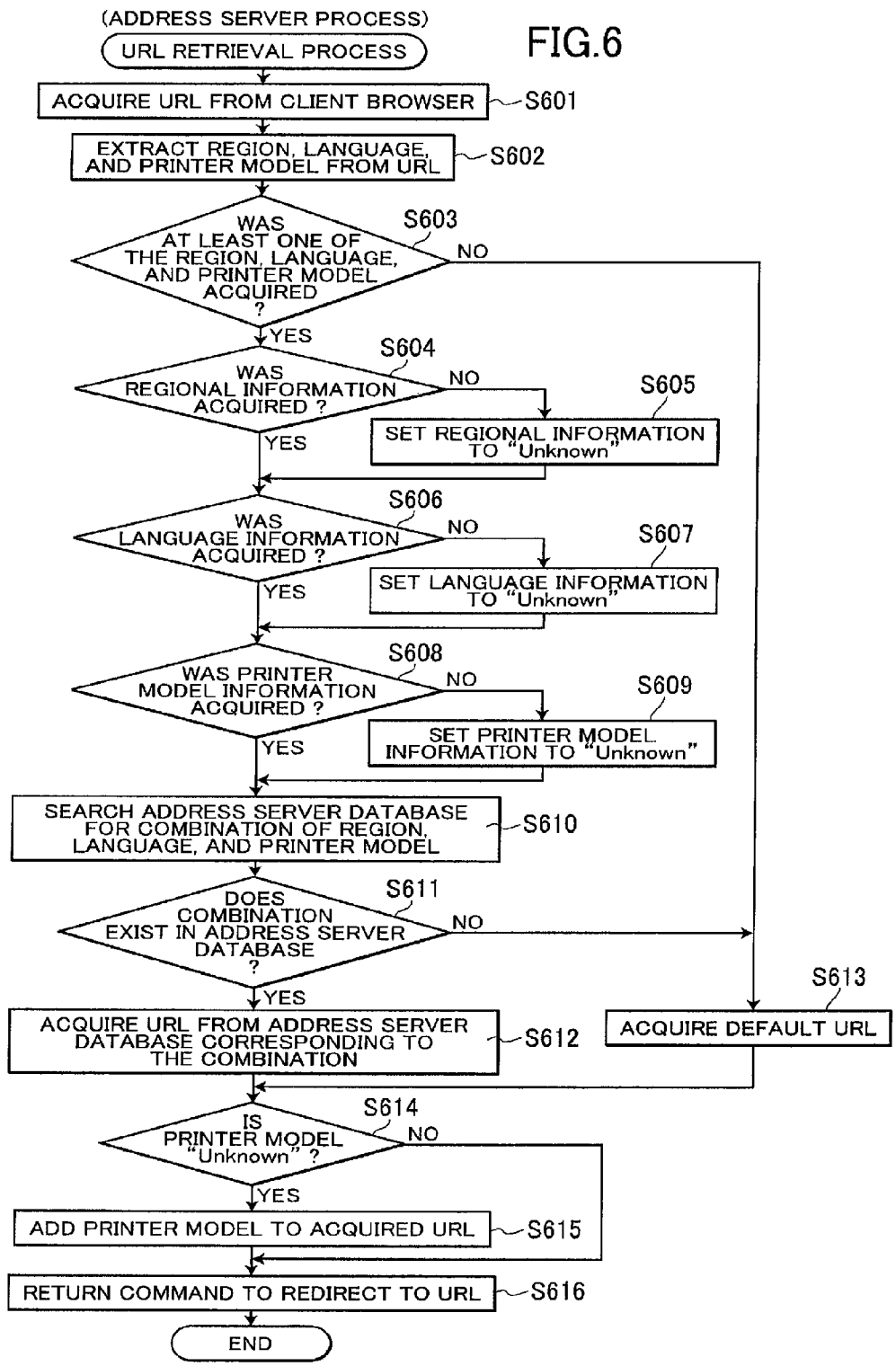
FIG. 6 is a flowchart illustrating steps in a URL retrieval process according to the first embodiment.
Figure 7:
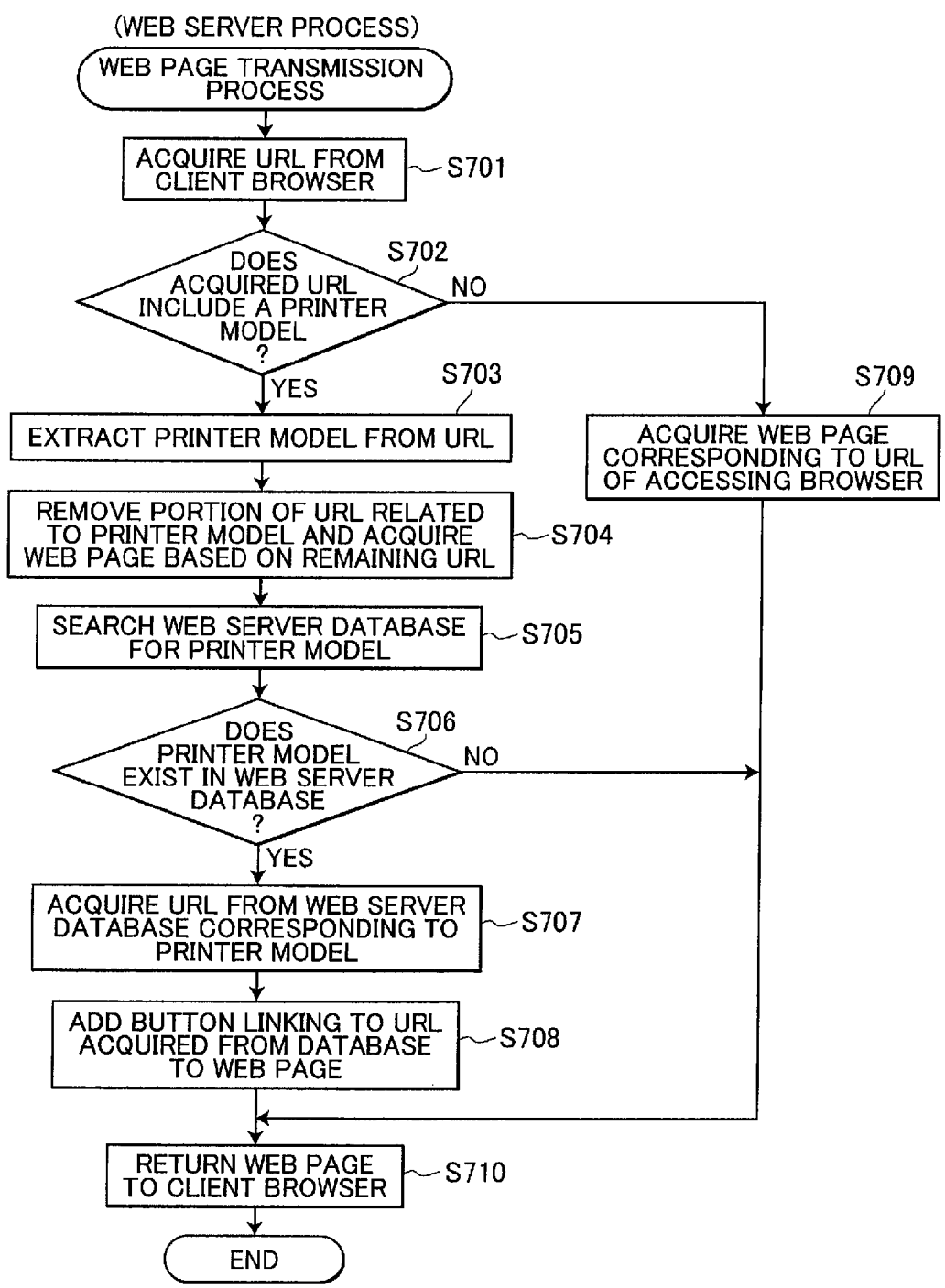
FIG. 7 is a flowchart illustrating steps in a Web page transmission process according to the first embodiment.

The CPU 61 of the Web server 60 executes the URL retrieval process according to the Web page transmission program 64*a* after the address server 20 issues a redirect command to the Web browser 15*b* of the client terminal 10 in the URL retrieval process of FIG. 6 and the CPU 11 of the client terminal 10 accesses the Web server 60 via the Web browser 15*b*.

In S701 at the beginning of the Web page transmission process, the CPU 61 acquires the URL accessing the Web server 60 from the client terminal 10 via the Web browser 15*b*. For example, the CPU 61 acquires a URL such as "http://www.brother-usa.com/genuine_ink.htm&model=M-86."

In S702 the CPU 61 determines whether the acquired URL includes the printer model name. If the URL includes the printer model name (S702: YES), then in S703 the CPU 61 acquires the printer model name. In this example, the CPU 61 acquires the printer model name "M-86".

In S704 the CPU 61 removes the portion of the URL acquired in S701 related to the printer model name and acquires a Web page based on the remaining URL. Specifically, the CPU 61 removes the "&model=M-86" portion from "http://www.brother-usa.com/genuine_ink.htm&model=M-86" to obtain "http://www.brother-usa.com/genuine_ink.htm" and acquires the Web page at this URL.

In S705 the CPU 61 sets the printer model as searching key to retrieve a corresponding linked URL from the Web server database 65a.

In S706 the CPU 61 determines whether the printer model exists in the Web server database 65a. If the printer model exists (S706: YES), then in S707 the CPU 61 acquires linked URLs corresponding to the printer model. In this example, the CPU 61 acquires three URLs from the Web server database 65a, including "http://www.brother-usa.com/m86.htm," "http://www.brother-usa.com/m86.inkcartridge.htm," and "http://www.brother-usa.com/m86.result_for_paperjam."

In S708 the CPU 61 adds buttons linked to the acquired URLs in the Web page acquired in S704 and advances to S710 described later. Since the CPU 61 acquired three URLs in S707, three buttons linked to these URLs are added to the Web page.

However, if the URL acquired in S701 does not include the printer model (S702: NO), in S709 the CPU 61 acquires a Web page at the URL the Web browser 15b of the client terminal 10 is accessing and subsequently advances to S710 described below.

In addition, if the corresponding printer model does not exist in the Web server database 65a (S706: NO), then the CPU 61 jumps to S710 described below without performing the processes in S707 and S708.

After acquiring the Web page with or without the additional link data corresponding to the printer model, in S710 the CPU 61 transmits this Web page to the Web browser 15b of the client terminal 10 and subsequently ends the Web page transmission process.

When the client terminal 10 receives the Web page from the Web server 60 via the Web browser 15b, the CPU 11 of the client terminal 10 controls the LCD 17 to display the Web page thereon. In other words, the CPU 11 controls the LCD 17 to display the page including service information, by using the language determined by CPU 11. Specifically, if the Web page includes buttons linking to other URLs and the user selects one of these buttons, the CPU 11 controls to display the Web page corresponding to the linked URL on the LCD 17 using the Web browser 15b.

Through the Web page transmission process, the client terminal 10 can conveniently display service information on the MFP 30 written in the desired language used by the user of the client terminal 10 and also relevant to the printer model used by the user and the location of the user.

Further, the installation process not only installs the printer driver 15d, but also enables the language information preset in the installer 15c to be acquired as language information in the URL creation process shown in FIG. 5, even when it is not possible to acquire the regional and language information set in the OS 15a.

With this communication system 1, the client terminals 10 can display service information related to the MFP 30 in a language familiar to the user.

Figure 8:
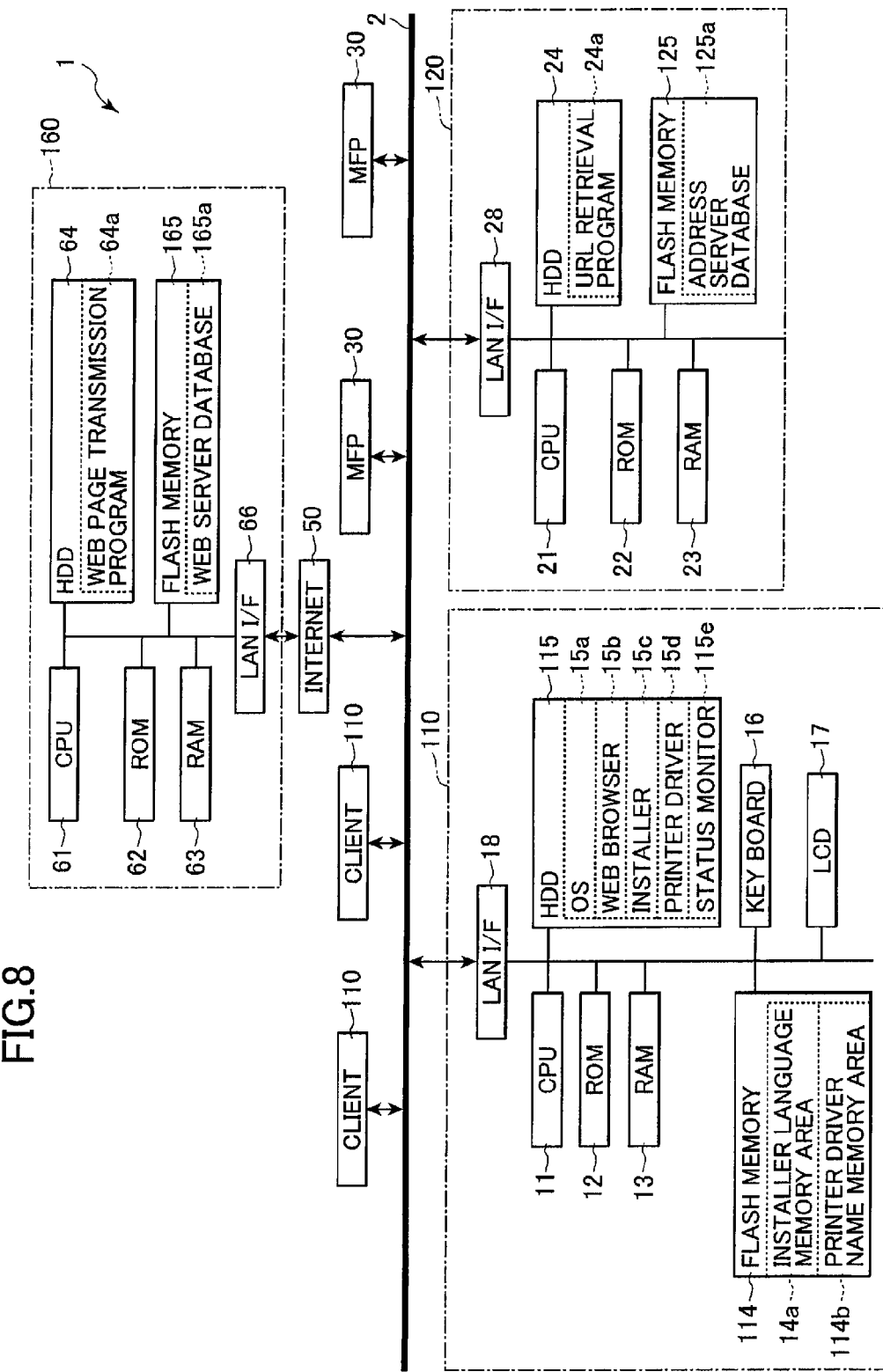
FIG. 8 is a block diagram showing the electrical structure of a communication system according to a second embodiment of the invention.

Next, a communication system in accordance with a second embodiment is shown in FIGS. 8 through 14. FIG. 8 is a block diagram showing the electrical structure of a communication system 100 according to the second embodiment, wherein like parts and components are designated with the same reference numerals to avoid duplicating description.

In the communication system 100, a plurality of clients 110, a data server 120, and the MFP 30 are connected each other by the local area network (LAN) 2 so that data can be transferred therebetween.

As with the client terminal 10 of the first embodiment, the client terminal 110 according to the second embodiment has the CPU 11, the ROM 12, the RAM 13, the keyboard 16, the LCD 17, and the LAN interface 18. In addition, the client terminal 110 includes a flash memory 114 in place of the flash memory 14 and a HDD 115 in place of the HDD 15. The flash memory 114 includes the installer language memory area 14a, and a printer driver name memory area 114b. The printer driver name memory area 114b stores the name of the printer driver 15d.

As with the HDD 15 of the first embodiment, the HDD 115 includes the OS 15a, the Web browser 15b, the installer 15c, and the printer driver 15d. In addition, the HDD 115 stores a status monitor 115e. The status monitor 115e is an application program for monitoring the status of the MFP 30, such as the amount of remaining ink, the presence of a recording medium, malfunctions, and the like. With the status monitor, the CPU 11 executes a URL creation process shown in FIG. 12 (described later).

As with the address server 20 of the first embodiment, the data server 120 according to the second embodiment has the CPU 21, the ROM 22, the RAM 23, and the HDD 24. In addition, the data server 120 includes a flash memory 125 in place of the flash memory 25.

The flash memory 125 has a data server database 125a for storing data such as that shown in FIG. 9. FIG. 9 is an explanatory diagram conceptually illustrating the data server database 125a. As with the address server database 25a, the data server database 125a stores correlations of the region data 25a1, the language data 25a2, and the printer model name 25a3, and the linked URL 25a4. In addition, the data server database 125a stores correlations of status data 125a5 and the linked URL 25a4.

Values stored as the status data 125a5 include "Ready" indicating that the amount of remaining ink is normal, "Ink Empty" indicating that there is no remaining ink, and "Ink Near Empty" indicating that there is a small amount of ink remaining.

As with the Web server 60 of the first embodiment, the Web server 160 according to the second embodiment has the CPU 61, the ROM 62, the RAM 63, and the HDD 64. In addition, the Web server 160 includes a flash memory 165 in place of the flash memory 65. The flash memory 165 stores a Web server database 165a storing the data shown in FIG. 10. FIG. 10 is an explanatory diagram conceptually illustrating the content of the Web server database 165a according to the second embodiment. As shown in FIG. 10, the Web server database 165a stores correlations of status data 165a3 and the linked URLs 65a2.

Data stored as the status data 165a3 in the example of FIG. 10 include "Ready" indicating that the amount of remaining ink is normal, "Ink Empty" indicating that there is no ink remaining, and "Paper Jam" indicating that recording media is jammed in the conveying path.

Figure 11:
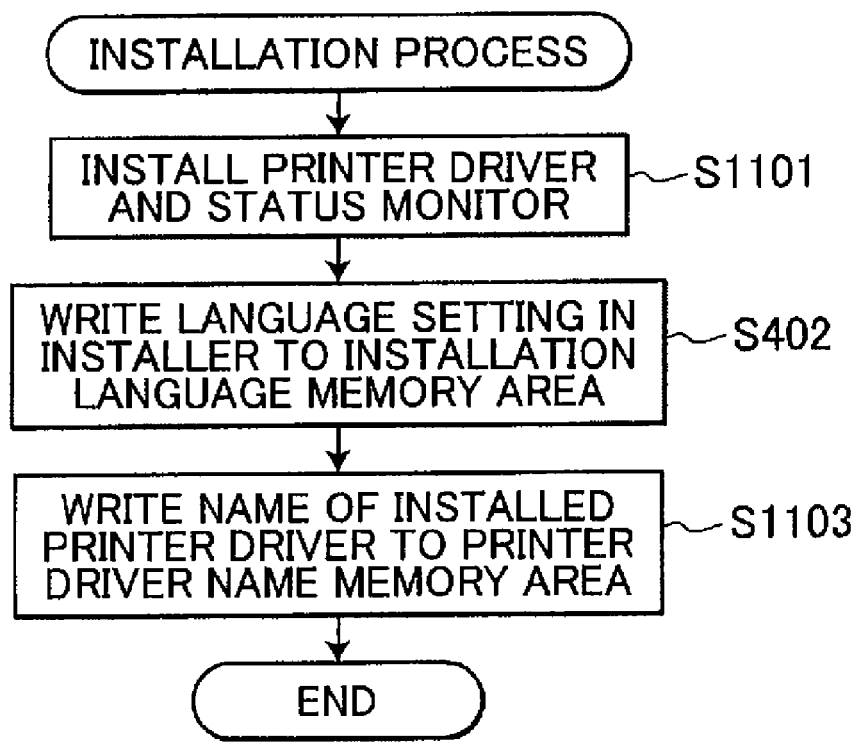
FIG. 11 is a flowchart illustrating steps in an installation process according to the second embodiment.

FIG. 11 is a flowchart illustrating steps in an installation process according to the second embodiment. The CPU 11 executes the installation process according to the second embodiment to install the printer driver 15d and the status monitor 115e using the installer 15c in the HDD 115.

In S1101 at the beginning of the installation process, the CPU 11 installs the printer driver 15d and the status monitor 115e using the installer 15c. In S402 the CPU 11 writes the language preset in the installer 15c to the installer language memory area 14a using the installer 15c. In S1103 the CPU 11 writes the name of the installed printer driver 15d to the printer driver name memory area 114b and subsequently ends the installation process.

Using the installer 15c for writing the name of the installed printer driver 15d to the printer driver name memory area 114b in this way enables the status monitor 115e to acquire the printer model name from the printer driver name stored in the printer driver name memory area 114b when executing the URL creation process, as will be described below.

Figure 12:
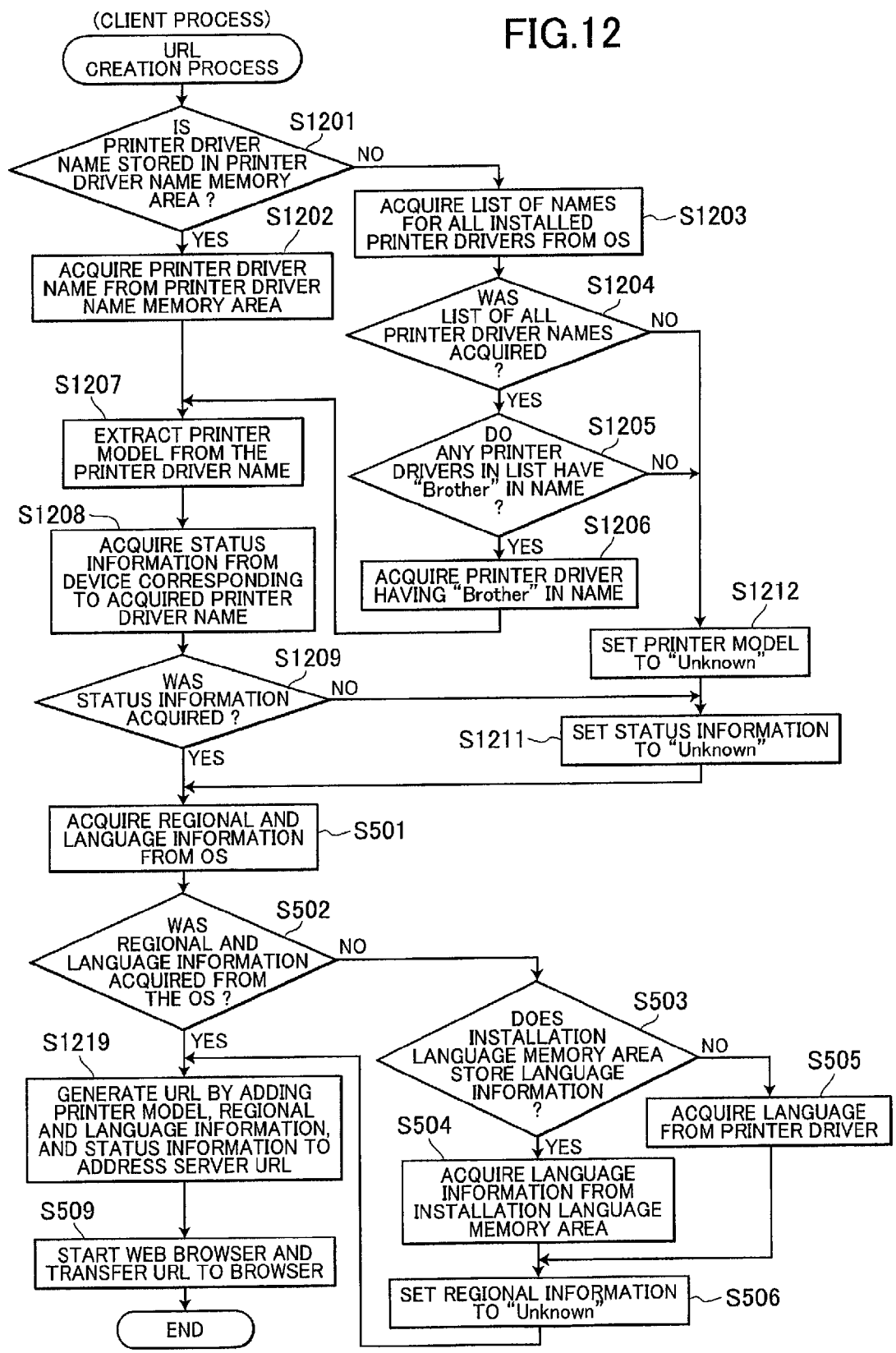
FIG. 12 is a flowchart illustrating steps in a URL creation process according to the second embodiment.

FIG. 12 is a flowchart illustrating steps in the URL creation process according to the second embodiment. The URL creation process according to the second embodiment is performed to create a URL as data to be transmitted to the data server 120.

The CPU 11 of the client terminal 110 executes URL creation process using the status monitor 115e, while the status monitor 115e is running and the user issues a command to execute the URL creation process via the keyboard 16. With this configuration, the client terminal 110 can determine whether the user intends to acquire service information and can execute this process at the desired timing.

In S1201 at the beginning of the URL creation process, the CPU 11 determines whether a printer driver name is stored in the printer driver name memory area 114b using the status monitor 115e. If a printer driver name is stored in the printer driver name memory area 114b (S1201: YES), then in S1202 the CPU 11 acquires the printer driver name using the status monitor 115e and subsequently advances to S1207.

However, if a printer driver name is not stored in the printer driver name memory area 114b (S1201: NO), in S1203 the CPU 11 acquires a list of names for all installed printer drivers from the OS 15a using the status monitor 115e. In S1204 the CPU 11 determines whether a list of all printer driver names was acquired using the status monitor 115e.

If a list of all printer driver names was acquired (S1204: YES), in S1205 the status monitor 115e determines whether any of the printer driver names in the acquired list includes "Brother" in the name.

If any of the printer driver names includes "Brother" in the name (S1205: YES), then in S1206 the CPU 11 acquires the printer driver name including "Brother" using the status monitor 115e and advances to S1207.

In S1207 the status monitor 115e extracts the printer model name from the printer driver name acquired in S1202 or S1206. In S1208 the CPU 11 acquires status information from the MFP 30 corresponding to the acquired printer driver name, and in S1209 determines whether status information was acquired from the MFP 30, using the status monitor 115e. If status information was acquired (S1209: YES), the status monitor 115e advances to S501.

However, if the status information cannot be acquired from the MFP 30 (S1209: NO), in S1211 the CPU 11 sets the status information to "Unknown" using the status monitor 115e and advances to S501. The CPU 11 also sets the status information to "Unknown" if a list of all printer driver names could not be acquired in S1204 (S1204: NO) and when the list of acquired printer drivers does not include a printer driver with "Brother" in the name (S1205: NO) In either case, the CPU 11 sets the printer model to "Unknown" in S1212, sets the status information to "Unknown" in S1211, and advances to S501.

Next, the CPU 11 performs the processes in S501-S506 to acquire or set regional and language information. The processes in S501-S506 are identical to those described in the first embodiment except that the CPU 11 executes the processes using the status monitor 115e in place of the printer driver 15d. So, a description of these processes will not be repeated here. Subsequently the CPU 11 advances to S1219.

In S1219 the CPU 11 creates a URL by adding the printer model name, the region information, and the language information acquired in the above processes, as well as the acquired status information, to the URL preset for the data server 120.

For example, if the URL preset for the data server 120 is "http://update.brother.co.jp/index?" and the CPU 11 acquired "USA" as the regional information and "ENG" as the language information in the above processes, in S1219 the CPU 11 creates the URL "http://update.brother.co.jp/index?model=M-86&country=USA&lang=ENG&status=ink_empty" using the status monitor 115e.

After creating the URL in S1219, in S509 the CPU 11 launches the Web browser 15b using the status monitor 115e while transferring the created URL to the Web browser 15b as transmission data. Subsequently, the URL creation process ends.

Through the URL creation process of the second embodiment, the client terminal 110 can add the data to the URL of the data server 120 that includes status information, as well as the regional information, the language information, and the printer model name, and can transmit this data as transmission data. Therefore, the client terminal 110 can easily transmit the status information to the data server 120.

Figure 13:
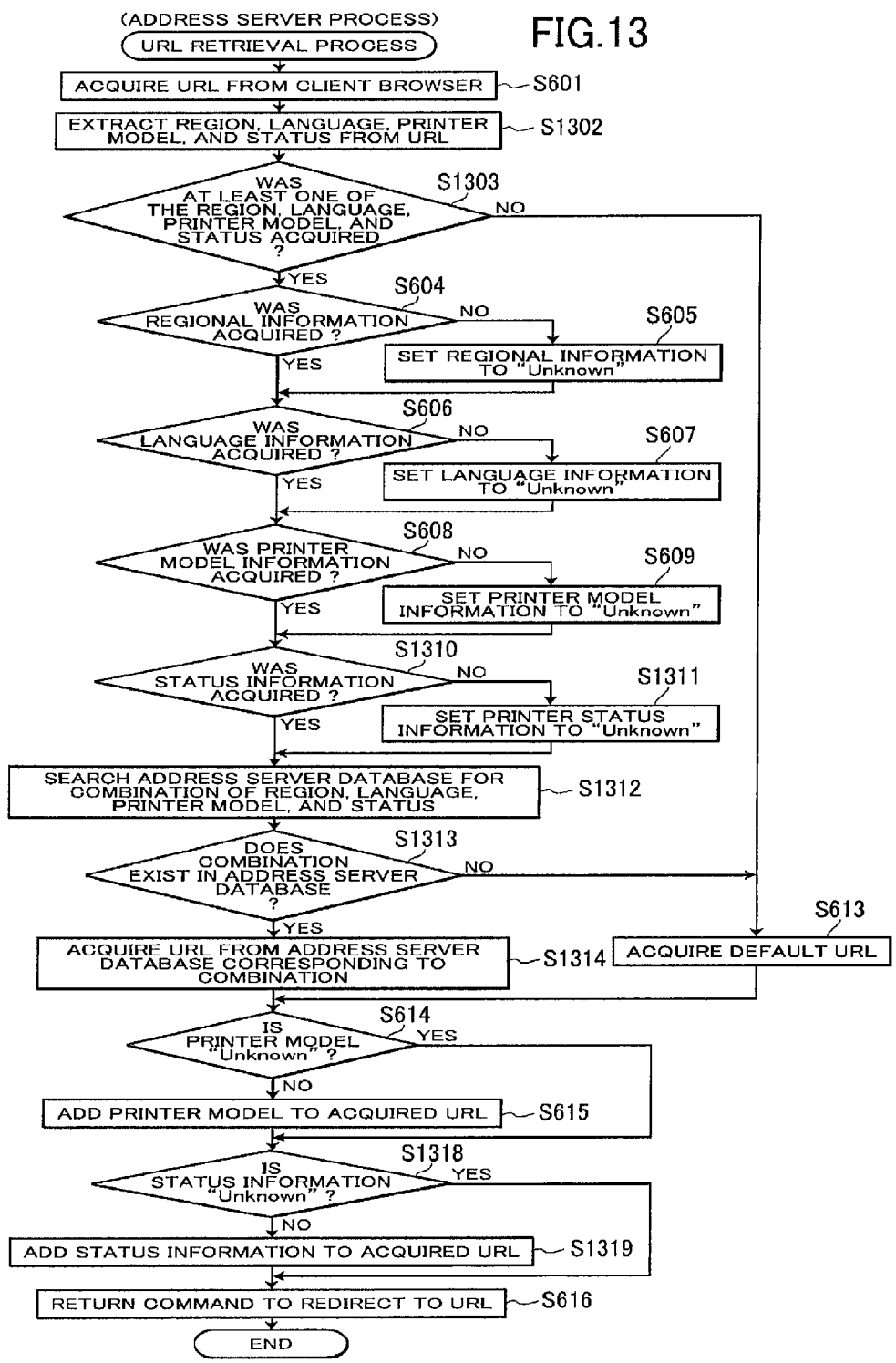
FIG. 13 is a flowchart illustrating steps in a URL retrieval process according to the second embodiment.

FIG. 13 is a flowchart illustrating steps in the URL retrieval process according to the second embodiment. The URL retrieval program 24a of the data server 120 executes this process when the data server 120 receives the URL transmitted from the client terminal 110 in the URL creation process of FIG. 12.

In S601 at the beginning of the URL retrieval process, the CPU 21 of the data server 120 acquires the URL used by the Web browser 15b of the client terminal 110 accessing the data server 120. In this example, the CPU 21 acquires the URL "http://update.brother.co.jp/index?model=M-86&country=USA&lang=ENG&status=ink_empty" created in S1219 of FIG. 12.

In S1302 the CPU 21 extracts the regional information, the language information, the printer model name, and the status information from the acquired URL. In this example, the CPU 21 acquires "USA" as the regional information, "ENG" as the language information, "M-86" as the printer model name, and "ink_empty" as the status information.

In S1303 the CPU 21 determines whether at least one of the regional information, the language information, the printer model name, and the status information was acquired. If at least one of these data could be acquired (S1303: YES), the CPU 21 advances to S604, executes the process in S604-S609, and advances to S1310. However, since the process in S604-S609 was described in the first embodiment, a description of this process will not be repeated. Through the process in S604-S609, the CPU 21 sets the regional information, the language information, and the printer model name to "Unknown" when the CPU 21 could not acquire these information or name.

In S1310 the CPU 21 determines whether status information was acquired. The CPU 21 advances to S1312 if status information was acquired (S1310: YES), or sets the status information to "Unknown" before advancing to S1312 if status information could not be acquired (S1310: NO).

Using the regional information, the language information, the printer model name, and the status information, in S1312 the CPU 21 retrieves a URL for a link corresponding to a combination of the regional information, the language information, the printer model name, and the status information, as searching key from the data server database 125*a*.

In S1313 the CPU 21 determines whether a combination of the region data 25*a*1, the language data 25*a*2, the printer model name 25*a*3, and the status data 125*a*4 corresponding to the searching key exists in the data server database 125*a*. If the combination corresponding to the searching key exists (S1313: YES), in S1314 the CPU 21 acquires the linked URL corresponding to the above combination. In this example, the CPU 21 acquires the URL "http://www.brother-usa.com/supplies_ink.htm" from the data server database 125*a*.

However, if the combination does not exist (S1313: NO) or if the CPU 21 could not extract even one of the regional information, the language information, the printer model name, and the status information from the URL acquired from the client terminal 110 in S1303 (S1303: NO), in S613 the CPU 21 acquires a preset default URL from the data server database 125*a* as the link. In this example, the CPU 21 acquires the URL "http://www.brother-usa.com/original.htm."

After acquiring the linked URL in S1314 or S613, in S614 the CPU 21 determines whether the printer model name is set to "Unknown." If the printer model name is not set to "Unknown" (S614: NO), then in S615 the CPU 21 adds the printer model name to the link acquired in S1314 or S613 and subsequently advances to S1318. In this example, the CPU 21 generates the URL "http://www.brother-usa.com/supplies_ink.htm&model=M-86."

However, if the printer model name is set to "Unknown" (S614: YES), the CPU 21 skips S615 and advances directly to S1318.

In S1318 the CPU 21 determines whether the status information is set to "Unknown." If the status information is not set to "Unknown" (S1318: NO), in S1319 the CPU 21 adds the status information to the URL generated in S615 and advances to S616. In this example, the CPU 21 generates the URL "http://www.brother-usa.com/supplies_ink.htm&model=M-86&status=ink_empty."

However, if the status information is set to "Unknown" (S1318: YES), the CPU 21 skips S1319 and advances directly to S616.

In S616 the CPU 21 transmits a command to the Web browser 15*b* of the client terminal 110 for redirecting to the URL created in S1314, S613, S615, or S1319 described above. Subsequently, the URL retrieval process ends.

Through the URL retrieval process of the second embodiment, in addition to link data for the MFP 30 obtained in the URL retrieval process of the first embodiment, the client terminal 110 can obtain link data providing service information corresponding to the status of the MFP 30.

Figure 14:
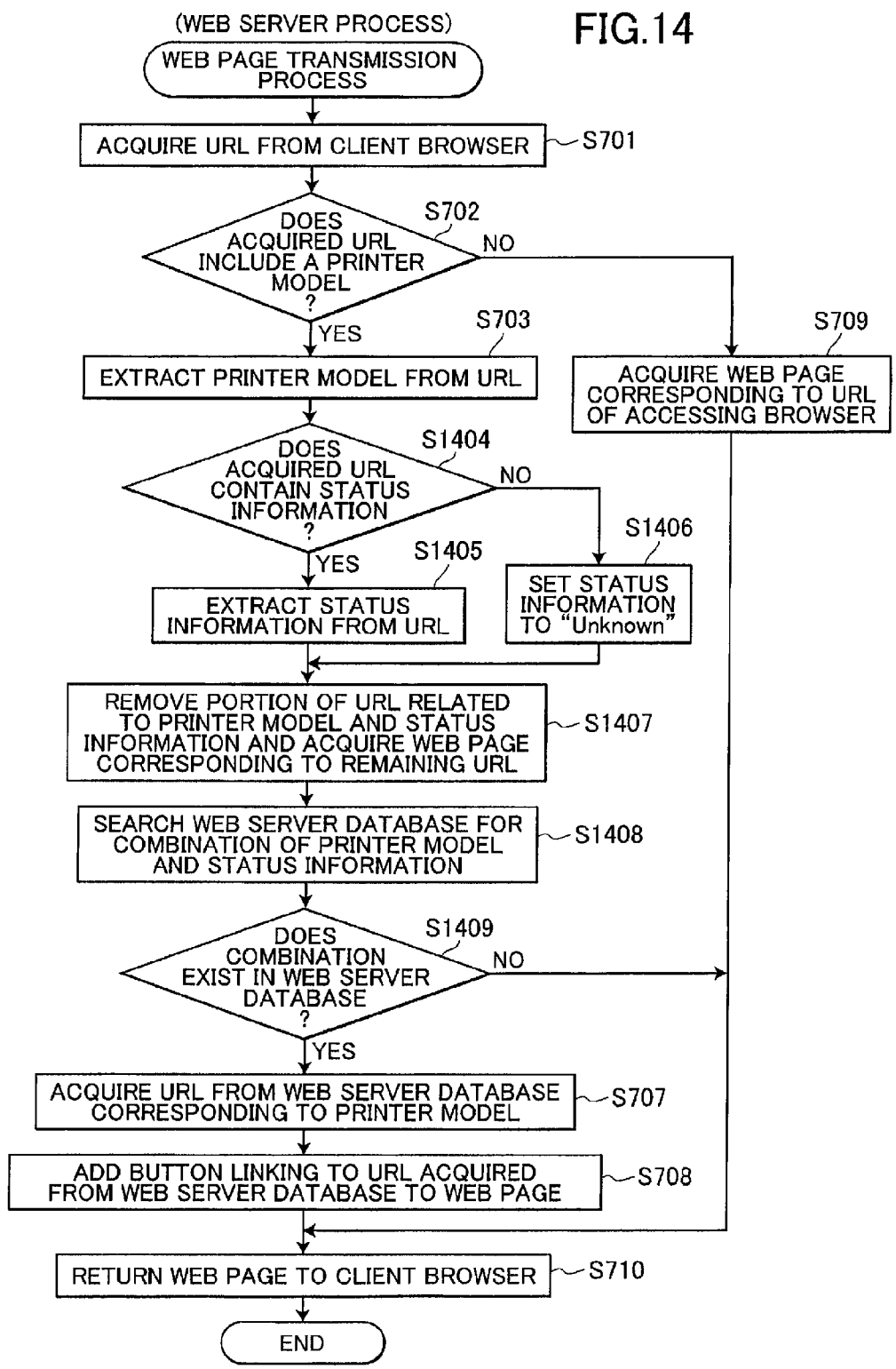
FIG. 14 is a flowchart illustrating steps in a Web page transmission process according to the second embodiment.

Next, a Web page transmission process of the second embodiment will be described with reference to the flowchart in FIG. 14. The CPU 61 of the Web server 160 executes Web process according to the Web page transmission program 64*a*. After the data server 120 issues a redirect command to the Web browser 15*b* of the client terminal 110 in the URL retrieval process of the second embodiment described in FIG. 13 and the Web browser 15*b* of the client terminal 110 accesses the Web server 160.

In S701 at the beginning of this process, the CPU 61 acquires the URL with which the Web browser 15*b* used to access the Web server 160. In this example, the CPU 61 acquires the URL "http://www.brother-usa.com/supplies_ink.htm&model=M-86&status=ink_empty."

In S702 the CPU 21 determines whether the acquired URL includes a printer model name. If the URL includes a printer model name (S702: YES), in S703 the CPU 21 extracts the printer model name. In this example, the CPU 21 extracts "M-86" as the printer model name.

In S1404 the CPU 61 determines whether the acquired URL includes status information. If the URL includes status information (S1404: YES), then in S1405 the CPU 61 extracts the status information from the URL and subsequently advances to S1407. In this example, the CPU 61 extracts "ink_empty" as the status information. However, if the URL does not include status information (S1404: NO), then in S1406 the CPU 61 sets the status information to "Unknown" and advances to S1407.

In S1407 the CPU 61 extracts a URL excluding portions related to the printer model name and the status information from the URL acquired in S701 to acquire a Web page. In this example, the CPU 61 removes "&model=M-86&status=ink_empty" from "http://www.brother-usa.com/supplies_ink.htm&model=M-86&status=ink_empty" to produce "http://www.brother-usa.com/supplies_ink.htm" and acquires the corresponding Web page.

In S1408 the CPU 61 uses a combination of the printer model name and the status information as a searching key to retrieve the URL for a link corresponding to the printer model name and status information from the Web server database 165*a*.

In S1409 the CPU 61 determines whether a combination of the printer model name 65*a*1 and the status data 165*a*3 corresponding to the searching key exists in the Web server database 165*a*. If this combination corresponding to the searching key exists (S1409: YES), then in S707 the CPU 61 acquires the URL for the link corresponding to the printer model name and the status information.

In this example, the CPU 61 acquires the URL "http://www.brother-usa.com/supplies_ink/m86_inkcartridge.htm" from the Web server database 165*a*.

In S708 the CPU 61 adds buttons containing links to the acquired URL to the Web page acquired in S1407 and subsequently advances to S710.

In addition, if the CPU 61 determines in S702 that the URL acquired in S701 does not include a printer model name (S702: NO), then in S709 the CPU 61 acquires the Web page used by the Web browser 15*b* of the client terminal 110 when accessing the Web server 160 and subsequently advances to S710.

Further, if the CPU 61 determines in S1409 that the combination of the printer model name and the status information does not exist in the Web server database 165*a* (S1409: NO), the CPU 61 skips the processes in S707 and S708 and advances directly to S710.

After acquiring the Web page with or without the additional link information corresponding to the combination of the printer model name and the status information, in S710 the CPU 61 transmits this Web page to the Web browser 15*b* of the client terminal 110. Subsequently, the Web page transmission process ends.

When the client terminal 110 receives the web page from the Web server 160, the CPU 11 of the client terminal 110 controls the LCD 17 to display this Web page thereon, using the Web browser 15*b*. If the Web page includes buttons as links and the user selects one of these buttons, the CPU controls the LCD 17 to display the Web page indicated by the corresponding link with using the web browser 15*b*.

Through the Web page transmission process described above, the client terminal 10 can display, with no trouble to the user, service information on the MFP 30 in the user's preferred language. Further, the service information is relevant to the model of the MFP 30 used by the user and the location of the user, and is also relevant to the status of the MFP 30.

Figure 15:
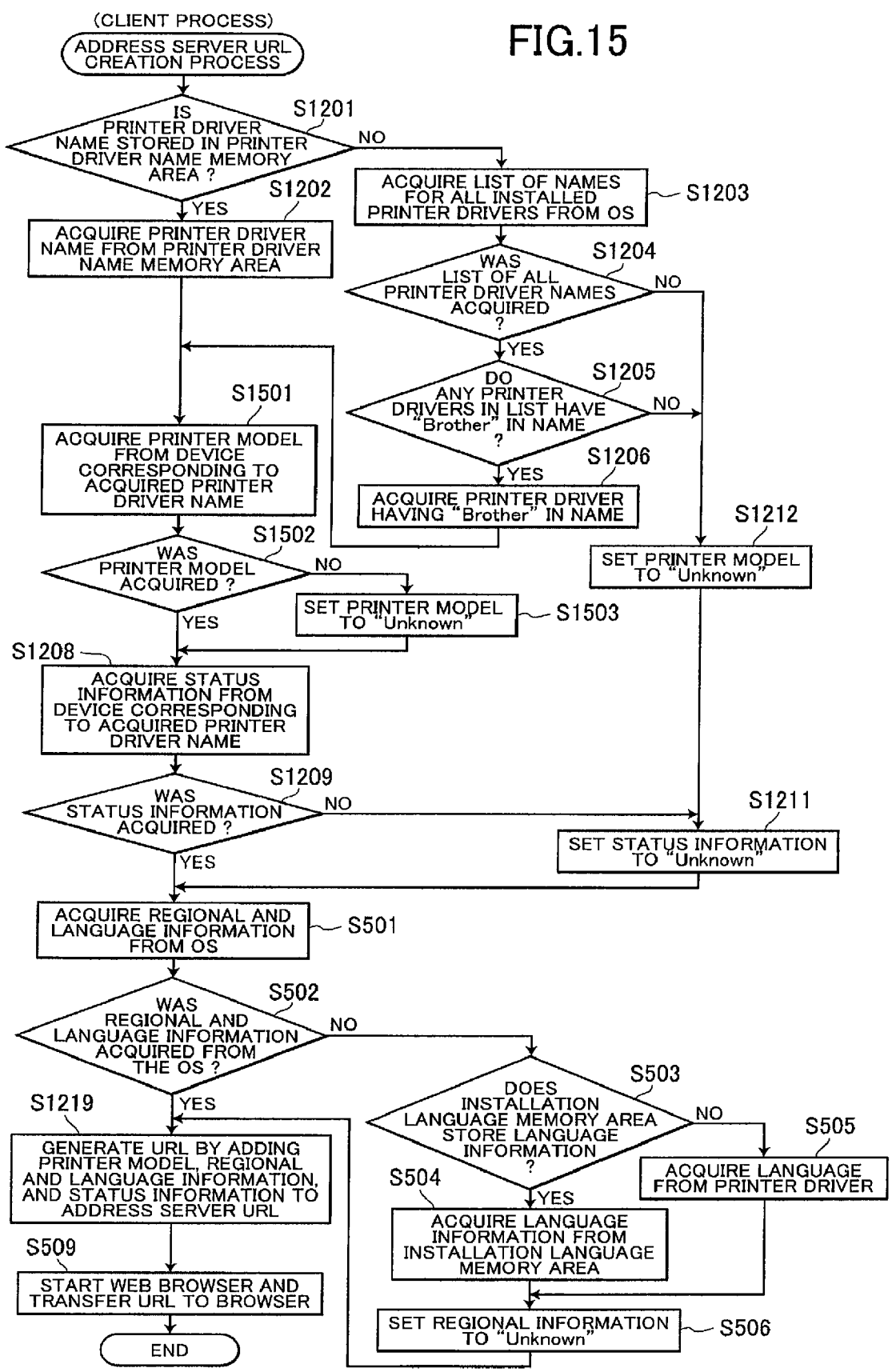
FIG. 15 is a flowchart illustrating steps in a URL creation process according to a third embodiment of the invention.

Next, a URL creation process according to a third embodiment of the present invention will be described with reference to FIG. 15. FIG. 15 is a flowchart illustrating steps in this process, with steps identical to those in the second embodiment described above labeled with the same step numbers to avoid duplicating description.

In the URL creation process according to the third embodiment, after acquiring the printer driver name from the printer driver name memory area 114b in S1202, in S1501 the status monitor 115e acquires the printer model name from the MFP 30 corresponding to the printer driver name acquired in S1202. In S1502 the CPU 11 determines whether the printer model name was acquired, with using the status monitor 115e. If the printer model name was acquired (S1502: YES), then the CPU 11 advances to S1208, as described in the second embodiment. However, if the printer driver name could not be acquired (S1502: NO), then in S1503 the CPU 11 sets the printer model name to "Unknown." The remainder of the process is identical to the second embodiment.

Hence, while the CPU 11 acquires the printer model name from the printer driver name with using the status monitor 15d in the URL creation process according to the second embodiment, the CPU 11 acquires the printer model name from the device specified in the printer driver name stored in the printer driver name memory area 14b in the URL creation process according to the third embodiment.

With the URL creation process according to the third embodiment, the client terminal 110 can reliably acquire a printer model from the MFP 30 specified in the printer driver, even if the printer model name cannot be acquired from the printer driver name.

While the invention has been described in detail with reference to the embodiments thereof, it would be apparent to those skilled in the art that various changes and modifications may be made therein without departing from the spirit of the invention.

While the URL retrieval process shown in FIGS. 6 and 13 is executed by the address server 20 in the first and second embodiments described above, this process may be executed within the client terminal 10 or 110 instead.

The MFP 30 has the same configuration as the client terminal 10 or 110 in addition to the configuration described above. In this case, while the client terminal 10 or 110 in embodiments executes the URL retrieval processes shown in FIGS. 5, 12 and 15, these processes may be executed within the MFP 30 instead of the client terminal 10 or 110.

Further, the examples in the embodiments are implemented on a wired LAN, but the present invention is not limited to this configuration. It should be apparent that the present invention may be applied to a network other than a wired LAN through which a plurality of MFP 30 can be connected. For example, the present invention may be applied to a wireless LAN network, a network combining a wired LAN and wireless LAN, a Bluetooth network, and the like.

What is claimed is:

1. A client terminal capable of communicating with an address server, the client terminal comprising:
    a displaying unit displaying a page;
    an operation system memory configured to store an operation system, the operation system using a first preset language;
    an installer language information memory configured to store preset language information indicating a second preset language;
    a device driver memory configured to store a device driver enabling the device controlling unit to operate, the device driver using a third preset language;
    a language determining unit determining, as a language to be used for displaying the page on the displaying unit, one preset language from at least two of: the first preset language, the second preset language, and the third preset language based on an order of the first preset language, the second preset language, and the third preset language;
    a device-model information acquiring unit acquiring device-model information indicating a device model of a device with which the client terminal is capable of communicating;
    an information transmitting unit transmitting, to the address server, the device-model information acquired by the device-model information acquiring unit and language information indicating the one preset language determined by the language determining unit;
    a service information acquiring unit acquiring service information, which corresponds to the transmitted device-model information and the transmitted language information, from a data server based on address information transmitted from the address server; and
    a display controlling unit controlling the displaying unit to display, by using the one preset language determined by the language determining unit, the page including the service information acquired by the service information acquiring unit.

2. The client terminal according to claim 1, further comprising:
    an address information acquiring unit acquiring the address information from the address server; and
    a request transmitting unit transmitting a service information request for the transmission of the service information to the data server.

3. The client terminal according to claim 2, further comprising a creating unit that creates transmitting data, the transmitting data including the language information, the device-model information, and an address request for transmission of the address information to the address server; and
    wherein the information transmitting unit transmits the transmitting data to the address server.

4. The client terminal according to claim 3, wherein the address request is a request for transmission of address hypertext data to the address server, the address hypertext data including the address information;
    wherein the address information acquiring unit acquires address hypertext data from the address server;
    wherein the request transmitting unit transmits a request for the transmission of one of first hypertext data and second hypertext data to the data server, the first hypertext data being a hypertext data capable of displaying a page of the service information on the displaying unit, the second hypertext data being a hypertext data capable of displaying a page including a hyperlink for the service information;

wherein the service information acquiring unit acquires the first hypertext data or the second hypertext data; and wherein the display controlling unit controls the displaying unit in such a manner the displaying unit displays the page based on the first hypertext data when the service information acquiring unit has acquired the first hypertext data, and the displaying unit displays the page based on the second hypertext data when the service information acquiring unit has acquired the second hypertext data.

5. The client terminal according to claim 4, further comprises:
   a communication unit capable of communicating with the device; and
   wherein the creating unit creates transmitting data including the device-model information, the language information, and the address request for transmitting the address hypertext data, the address hypertext data identifying the data server storing information about device as the service information.

6. The client terminal according to claim 5, further comprising:
   an Web browser memory storing an Web browser that enables the address information acquiring unit, the request transmitting unit, and the service information acquiring unit to operate; and
   an inputting unit including the device-model information acquiring unit and the creating unit, and inputting the transmitting data to the Web browser.

7. The client terminal according to claim 6, further comprising an accepting unit accepting instructions from a user to implement the inputting unit.

8. The client terminal according to claim 5, further comprising a monitoring unit that monitors the status of the device.

9. The client terminal according to claim 8, further comprising:
   a device monitor memory storing a device monitor that enables the monitoring unit to operate;
   an Web browser memory storing an Web browser that enable the address information acquiring unit, the request transmitting unit, and the service information acquiring unit to operate; and
   an inputting unit including the status information acquiring unit and the creating unit, and inputting the transmitting data to the Web browser.

10. The client terminal according to claim 9, wherein the device monitor further comprises an accepting unit accepts instructions from a user to implement the inputting unit.

11. The client terminal according to claim 9, wherein the communication unit is capable of communication with a plurality of devices;
    wherein the device driver enables at least one of the plurality of devices and the device information acquiring unit to operate; and
    wherein the device monitor monitors the status of at least one of the plurality of devices.

12. The client terminal according to claim 5, further comprising a status information acquiring unit acquiring status information indicating status of the device; and
    wherein the creating unit creates transmitting data including the status information, the device-model information, the language information, and the request for transmitting the address hypertext data, the data server identified according to the address hypertext data, the data server storing information corresponding the status of the device as the service information.

13. The client terminal according to claim 12, wherein the status information indicates status of consumables in the device; and
    wherein the service information acquiring unit acquires the service information that is information about the consumables.

14. The client terminal according to claim 13, wherein the status information acquiring unit acquires status information indicating necessity for replacement of the consumables.

15. The client terminal according to claim 13, wherein the device is an image-forming device, and the consumables is a developer cartridge storing therein developer; and
    wherein the status information acquiring unit acquires status information indicating that amount of developer stored in the developer cartridge has reached a predetermined amount.

16. A communication system comprising:
    a network; and
    a client terminal and an address server capable of communicating with each other via the network;
    wherein the client terminal comprises:
        a displaying unit displaying a page;
        an operation system memory configured to store an operation system, the operation system using a first preset language;
        an installer language information memory configured to store preset language information indicating a second preset language;
        a device driver memory configured to store a device driver enabling the device controlling unit to operate, the device driver using a third preset language
        a language determining unit determining, as a language to be used for displaying the page on the displaying unit, one preset language from at least two of: the first preset language, the second preset language, and the third preset language based on an order of the first preset language, the second preset language, and the third preset language;
        a device-model information acquiring unit acquiring device-model information indicating a device model of a device with which the client terminal is capable of communicating;
        an information transmitting unit transmitting, to the address server, the device-model information acquired by the device-model information acquiring unit and language information indicating the one preset language determined by the language determining unit;
        a service information acquiring unit acquiring service information, which corresponds to both the transmitted device-model information and the transmitted language information, from a data server based on address information transmitted from the address server, the address information specifying the data server that stores service information to be displayed by using the one preset language determined by the language determining unit; and
        a display controlling unit controlling the displaying unit to display, by using the one preset language determined by the language determining unit, the page including the service information acquired by the service information acquiring unit;
    wherein the address server comprises:
        an information receiving unit receiving the device-model information and the language information transmitted that are transmitted by the information transmitting unit of the client terminal;

a data server determining unit determining the data server based on the device-model information and the language information that are received by the information receiving unit; and an address information transmitting unit transmitting address information to the client terminal, the address information specifying the data server determined by the data server determining unit.

17. A communication method for a client terminal and which is capable of communicating with an address server, the communication method comprising step of:

determining, as a language to be used for displaying a page on a displaying unit of the client, one preset language from at least two of: a first preset language used by an operation system, a second preset language stored in an installer language information memory, and a third preset language used on a device driver;

acquiring device-model information indicating a device model of a device with which the client terminal is capable of communicating;

transmitting, to the address server, the device-model information acquired in the acquiring process and language information indicating the one preset language determined in the determining process;

acquiring service information, which corresponds to the transmitted device-model information and the transmitted language information, from a data server based on address information transmitted from the address server; and controlling the displaying unit to display, by using the one preset language determined in the determining process, the page including the service information.

18. A non-transitory computer-readable recording medium that stores a data processing program provided on a client terminal capable of communicating with an address server, the data processing program comprising instructions for:

determining, as a language to be used for displaying a page on a displaying unit of the client, one preset language from at least two of: a first preset language used by an operation system, a second preset language stored in an installer language information memory, and a third preset language used on a device driver;

acquiring device-model information indicating a device model of a device with which the client terminal is capable of communicating;

transmitting, to the address server, the device-model information acquired in the acquiring process and language information indicating the one preset language determined in the determining process;

acquiring service information, which corresponds to the transmitted device-model information and the transmitted language information, from a data server based on address information transmitted from the address server; and controlling the displaying unit to display, by using the one preset language determined in the determining process, the page including the service information.

19. The client terminal according to claim 1, wherein the information transmitting unit transmits the device-model information and the language information to the address server in an URL format.

20. The client terminal according to claim 1, further comprising:

an URL information creating unit configured to create an URL information in an URL format, the URL information include the device-model information and the language information; and an Web browser that enables the information transmitting unit to transmit, to the address server, the device-model information and the language information that are included in the URL information.

21. The client terminal according to claim 1, wherein the first preset language is first in the order among the at least two preset languages.

22. The client terminal according to claim 1, wherein the third preset language is last in the order among the at least two preset languages.

23. A client terminal capable of communicating with an address server, the client terminal comprising:

a displaying unit displaying a page;

a first memory configured to store first data corresponding to a first language, the first data being one of an operation system, an installer language information, and a device driver, wherein the operation system uses an operation system language, the installer language information indicates a prescribed preset language, and the device driver uses a device driver language;

a second memory configured to store second data corresponding to a second language, the second data being one of the operation system, the installer language information, and the device driver, wherein the second data is different from the first data;

a first determining unit configured to determine whether the first memory stores the first data;

a language determining unit determines that the first language as a language to be used for displaying the page on the displaying unit when the first determining unit determines that the first memory stores the first data, and determines that the second language as the language to be used for displaying the page on the displaying unit when the first determining unit determines that the first memory does not store the first data;

a device-model information acquiring unit acquiring device-model information indicating a device model of a device with which the client terminal is capable of communicating;

an information transmitting unit transmitting, to the address server, the device-model information acquired by the device-model information acquiring unit and language information indicating the language determined by the language determining unit;

a service information acquiring unit acquiring service information, which corresponds to both the transmitted device-model information and the transmitted language information, from a data server based on address information transmitted from the address server; and a display controlling unit controlling the displaying unit to display, by using the language determined by the language determining unit, the page including the service information acquired by the service information acquiring unit.

24. The client terminal according to claim 21, wherein the first data is the operation system and the first language is the operation system language.

25. A non-transitory computer-readable recording medium that stores a data processing program provided on a client terminal capable of communicating with an address server, the data processing program comprising instructions for:

determining whether a first memory stores first data, the first data corresponding to a first language, the first data is one of an operation system, an installer language information, and a device driver, wherein the operation system uses an operation system language, the installer language information indicates a prescribed preset language, and the device driver uses a device driver language;

determining the first language as a language to be used for displaying the page on the displaying unit when the first memory stores the first data;

determining a second language as the language to be used for displaying the page on the displaying unit when the first memory does not store the first data, the second language corresponding to second data stored in a second memory, wherein the second data is one of the operation system, the installer language, and the device driver, and the second data is different from the first data;

acquiring device-model information indicating a device model of a device with which the client terminal is capable of communicating;

transmitting, to the address server, the device-model information acquired in the acquiring process and language information indicating the language determined in the determining process;

acquiring service information, which corresponds to both the transmitted device-model information and the transmitted language information, from a data server based on address information transmitted from the address server; and controlling the displaying unit to display, by using the language determined in the determining process, the page including the service information.

* * * * *